Figure 1:
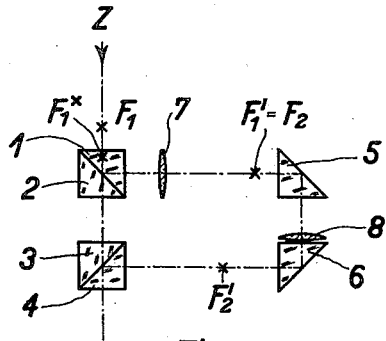

Sept. 29, 1936. O. EPPENSTEIN 2,055,684
OPTICAL DEVICE FOR THE EXAMINATION OF AXIAL DIRECTIONS AND THE LIKE
Filed Aug. 15, 1933 2 Sheets-Sheet 1

Inventor:
Otto Eppenstein

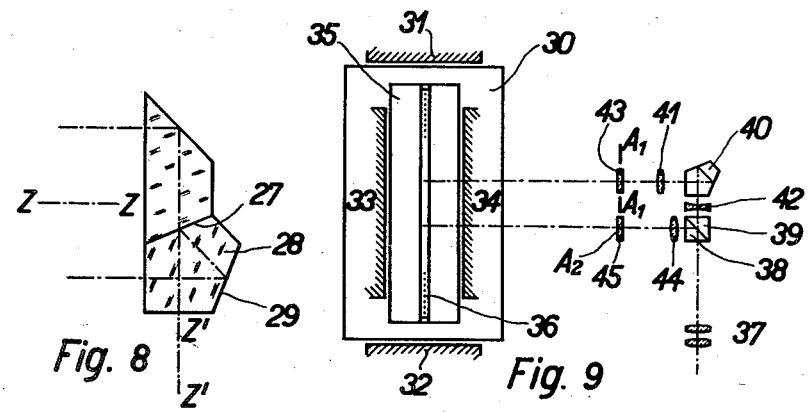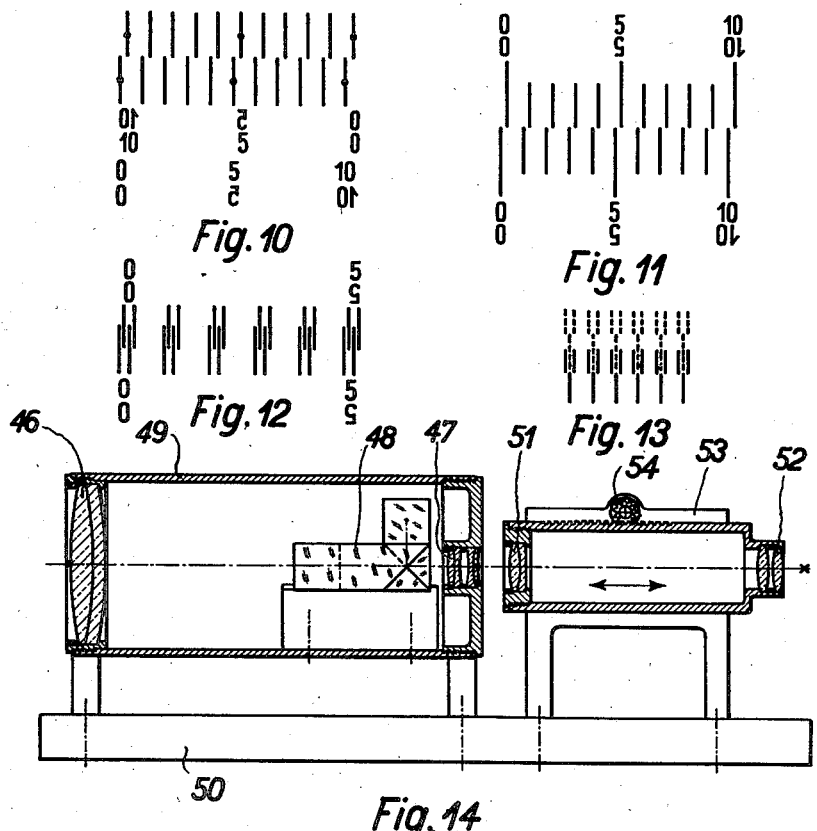

Patented Sept. 29, 1936

2,055,684

UNITED STATES PATENT OFFICE 2,055,684

OPTICAL DEVICE FOR THE EXAMINATION OF AXIAL DIRECTIONS AND THE LIKE

Otto Eppenstein, Jena, Germany, assignor to firm Carl Zeiss, Jena, Germany

Application August 15, 1933, Serial No. 685,239
In Germany August 20, 1932

1 Claim. (Cl. 88—14)

Sighting devices are known by means of which the coincidence of two axial directions or the evenness of a surface is examined. This examination is effected by either adjusting by means of a telescope two aiming marks subsequently to each other or by making the telescope give one and the same aiming mark two or more directions, the telescope producing an erect and an inverted image of the aiming mark, and an adjustment being effected by making these two images coincide with each other. Examining a straight guide is a similar task, which may be solved by quite the same means. These means are however, of no avail when the aiming mark is at a small distance from the observing eye, because the two images of the mark will have a parallax relative to each other, that is to say because they will move sidewards as soon as the eye is moved to the side, the reason being that the two images are not in one and the same plane any longer.

The invention, which overcomes this disadvantage, is based on the following idea. The known optical sighting devices represent special cases of two interconnected optical systems consisting of reflecting, refracting, or reflecting and refracting surfaces, and these systems image with equal magnification a common object space in a common image space in such a manner that the two images of the principal axis of the object space coincide with respect to direction, but that the two images of two secondary axes at right angles to the principal axis and to each other have reverse directions. The parallax is neutralized by so constructing these two interconnected optical systems that each object plane at right angles to the principal axis is imaged by the two systems in one and the same image plane. The principal axis is determined by the fact that its images are parallel to the viewing direction. One need not necessarily restrict oneself to the case in which the images of the two secondary axes have reverse directions, that is to say that the two images of a figure which are produced by the two systems and lie in a plane at right angles to the principal axis are completely reversed relatively to each other. Only the images of a secondary axis are required to have reverse directions, which means that the two images of a figure of this kind are laterally inverse. Such pairs of systems may be used for the examination of planes.

The characterized pairs of systems need not consist of reflectors disposed in front of the objective of a telescope. Reflecting systems of this kind may be positioned as well anywhere behind the objective or, when the demands upon accuracy are not as high, they may be applied without a telescope. The reflectors may be used in connection with additional lens combinations.

When the two secondary axes are imaged in such a manner that their images are reverse to each other, there always exists a line at right angles to them whose two images coincide with each other not only as regards direction but also with respect to position. This line is the sighting line determined by the pair of optical systems. The feature characterizing the invention, namely that the two images of a plane at right angles to the principal axis coincide, effects that the two images of the sighting line coincide everywhere. By means of this coincidence it is ascertained whether an aiming mark is in the sighting line. When the two images of only one secondary axis have inverse directions, and when the images of the other secondary axis correspond to each other with respect to direction, there is no sighting line but only a plane which is parallel to the pricipal axis and whose two images coincide, this plane being at the right angles to the first said secondary axis. When a line at right angles to the principal axis and parallel to the said other secondary axis is made to lie in this plane the two images of this line coincide, and it may be determined whether a sighting line (which is imaged for instance as a line parallel to the said other secondary axis) lies in the sighting plane.

The rays emanating from the aiming mark and producing one image may be identical with those which cause the other image. In this case, the said rays are to be divided by physical division (for instance on a surface which is partly transparent and partly reflecting). However, before reaching the two systems, the said rays may as well be apart. It is possible in itself to keep the ray pencils separate subsequently to their having traversed the two systems, but a measurement will be more accurate when the rays are physically made to coincide at least before they enter the eye, which is effected by the same means as is the physical division.

When using a telescope, it is specially advantageous to have this telescope equipped with a telescope objective, viz. an objective consisting of two members so disposed relatively to each other that the rear focal point of the front member coincides with the front focal point of the rear member. An objective of this kind offers the advantage that the aiming mark appears equally large at any distance, another advantage of the said objective being that the aiming mark may be brought to very near in front of the objective without the necessity of adjusting the eye-piece very much.

The new optical pairs of systems may be used in quite a novel manner for reading scale divisions at different distances. In the measurement of coordinates, for instance, there is to be determined the displacement of a slide in one direction, this slide being at the same time at different distances from the stationary reading telescope. When this reading telescope is provided with a pair of the said optical systems, and when a plane at right angles to the division is chosen as the sighting plane of this pair of systems, there will be seen two reverse images of the division. The reading point is that point of the scale at which equal scale values coincide. It may be convenient to displace the two images of the scale at right angles to the direction of the scale, and this in order to better distinguish the one image from the other. The two scale images may be separated as well by imaging in such a manner that the one scale image has a direction at right angles to the scale and reverse to the other scale image and that the foot points of the scale lines touch each other in a line.

In each of the said cases, it is convenient to apply an optical auxiliary means (a micrometer), for instance a tiltable plano-parallel plate, which displaces by measurable quantities the one of the two scale images, or the two scale images relatively to each other, in such a manner that two lines exactly coincide with each other. This coincidence may be ascertained by determining in the manner usual with coincidence rangefinders whether the lines represent one straight line. The lines may be as well double lines and each two of these double lines may be given such positions as to provide three equal intermediate spaces. The loci coinciding in the two scales are not the middles of the double lines, but they are displaced relatively to these middles by an unchanging quantity, which means that no error may arise.

Figure 2:
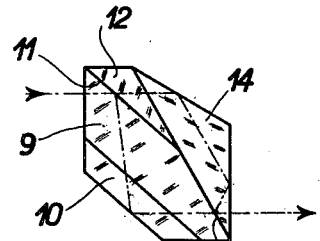
Figure 3:
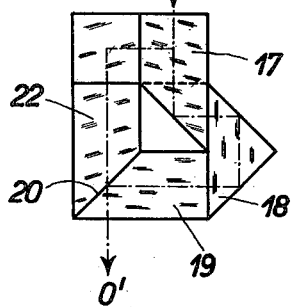
Figure 4:
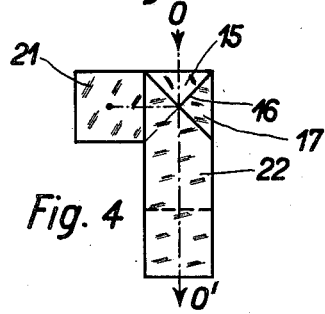
Figure 5:
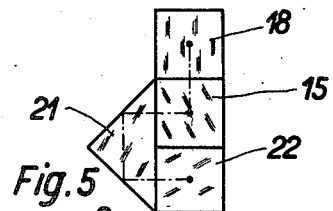
Figure 6:
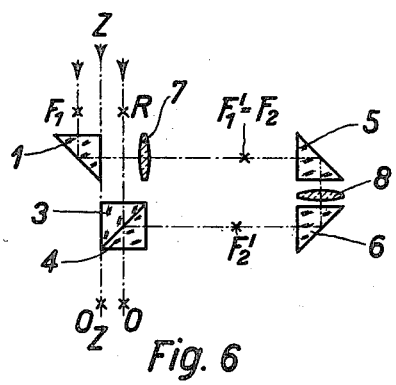
Figure 7:
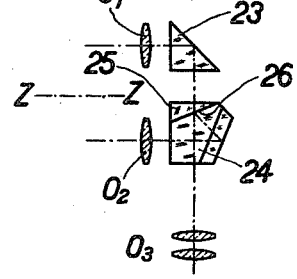

The accompanying drawings represent some examples of the invention. Figure 1 shows an example consisting of reflecting prisms and lenses. Figure 2 illustrates an example consisting of reflecting prisms only. Figures 3 to 5 illustrate three views of another example consisting only of reflecting prisms, Figure 3 being an elevation, Figure 4 being another elevation, as seen from the left of Figure 3, and Figure 5 being a plan view, as seen in the direction of the arrows in Figure 4. Figure 6 represents another example consisting of reflecting prisms and lenses. Figure 7 shows a further example consisting of reflecting prisms and lenses. Figure 8 represents a further example consisting of reflecting prisms only. Figure 9 illustrates schematically a device for reading coordinates. Figure 10 shows the scale images seen by an observer using a device according to Figure 9. Figure 11 shows the scale images obtained when use is made of an instrument according to Figure 7. Figure 12 shows the scale images obtained in the case of a scale with double lines. Figure 13 represents the scale images obtained in the case of a scale with triple lines, and Figure 14 illustrates a constructional example in section.

In the example according to Figure 1, the one of the two interconnected optical systems consists of two rectangular prisms 1 and 2 cemented together and of two rectangular prisms 3 and 4 also cemented together. The cemented surfaces are semi-transparently silvered. The effect produced by this system on the traversing ray pencils is that of two plano-parallel plates. The other system, which affects the pencil reflected by the cemented surfaces of 1, 2, consists of the prisms 1, 5, 6 and 4 and of the converging lenses 7 and 8 of equal focal lengths. These lenses are so positioned that the rear focus $F_1'$ of 7 coincides with the front focus $F_2$ of 8, the lenses therefore representing an image reversing telescope of a one-fold magnification. Let the front focus $F_1$ of the lens 7 be virtually imaged at the point $F_1^*$ by the system 1, 2, 3, 4 representing two plano-parallel plates, and let $F_1^*$ coincide with the virtual mirror image the prism 4 produces of the rear focus $F_2'$ of the lens 8. As the parts 1, 7, 5, 8 and 6 image the point $F_1$ at $F_2'$, and as the prism 4 images this point at $F_1^*$, all of the second optical system images the axially vertical plane at $F_1$ in the same axially vertical plane as does the first system, namely that at $F_1^*$. In this case the image is however completely reversed. As the two systems provide equal depth magnifications, that is to say a one-fold magnification, all axially vertical image planes of the first system coincide with those of the second. On account of the complete inversion in the second system, there is obtained a sighting line, namely the axis Z—Z.

In Figure 2, the two interconnected systems consist of mirrors only. The surface 11 of a prism 9 having a roof 10 is cemented to a prism 12, and the surface 13 of this prism 9 is cemented to a prism 14. The surfaces 11 and 13 are partly transparent and partly reflecting. A ray entering the prism 9 from the left is divided by the surface 11 into two partial rays, one of which is so reflected on the roof 10 as to traverse the surface 13. The partial ray traversing the surface 11 is twice totally reflected in the prism 14, subsequently to which it is reflected on the partly reflecting surface 13 in such a manner that it coincides with the first partial ray. The one optical system consists of the prism 9 and of part of the prism 14, and the other optical system consists of part of the prism 9 and of the prisms 12 and 14. The coincidence of the images provided by the two systems is attained by the fact that the optical paths of the two rays are equally long. The sighting line is the entering ray represented in the drawings. All pairs of systems with two physical divisions may be used reversed.

Figures 3 to 5 illustrate three views of a pair of systems which is equivalent to the one described above. A ray entering at 0 a rectangular prism 15 is divided by the semi-transparently silvered surface 16 into two partial rays. The one of these partial rays traverses this surface and is deflected at 90° by one deflection in a rectangular prism 17 and at 180° by two deflections in a prism 18. Subsequently thereto, the said partial ray strikes a half-silvered surface 20 in a prism 19, which gives it the direction 0', the direction 0' being parallel to the direction the ray had before entering the system. The other partial ray is so deflected at 90° by the surface 16 as to be directed to a prism 21, in which it is deflected twice so as to be emitted to a prism 22 that gives it the direction 0' and makes it emerge by way of the surface 20. All prisms may be cemented. However, the prisms 18 and 21, for instance, may be at a short distance from the remaining body, which offers the advantage that the optical lengths of the two systems may be made exactly equal by varying the intermediate space. The line O (or O' when the pair of systems is used in the reverse sense) is the sighting line.

Contrary to the three examples according to Figures 1, 2 and 3 to 5, the object rays common in the two optical systems of the examples according to Figures 6 and 7 are different from each other. The device according to Figure 6 offers the advantage that pairs of systems of this kind may be used as well behind the objective of a telescope, that is to say that the device may have a small field of view and consequently that it may be of a smaller size. The device according to Figure 7 provides a greater brightness, and this on account of one of the physical division of the pencils being dispensed with. In this case, the pairs of systems are conveniently used only in front of a telescope objective.

The device according to Figure 6 is similar to the one according to Figure 1, the difference being that there is no prism 2 and that the pencil traversing in straight direction does not strike the prism 1 but passes it at the side. The one imaging system consists of the prisms 3 and 4, which represent a plano-parallel plate and whose hypotenuse surfaces are semi-transparent. The other imaging system consists of the parts 1, 7, 5, 8, 6 and 4. The lenses 7 and 8 represent a reversing telescope magnifying one time. The reflecting prism 4 virtually images the point $F_2'$ at a point R which lies in the same axially vertical plane as the front focus $F_1$ of the lens 7. From the considerations made with respect to the example represented by Figure 1, it follows that the two images of an axially vertical plane coincide. In the case of Figure 6, however, that line Z—Z of the object space which is reflected into itself, that is to say the sighting line, is laterally displaced relatively to the axis of the system 1, 7, 5, 8, 6, 4, which is reflected into the object space, by only half of what it is laterally reflected by the system 3, 4. A telescope objective behind this double system conveniently fills the aperture O—O. The sighting line does not traverse the middle of the telescope, which is contrary to the device according to Figure 1, in which the axis of a telescope to be disposed behind the double system would coincide with the sighting line.

In the device according to Figure 7, the objective $O_1$, the totally reflecting prism 23 and the plano-parallel plate consisting of the pentagonal prism 24 and the prism 25 cemented thereto may be regarded to represent one of the two systems; and the objective $O_2$ and the pentagonal prism 24 having a roof may be considered to represent the other system. The cemented surface 26 is half silvered. Those surfaces of the prisms 23 and 25 which face each other have such a distance apart that the two objectives $O_1$ and $O_2$, which are equal to each other, image an axially vertical object plane in one and the same image plane. The sighting line is Z—Z. The sighting telescope is completed by adding an eye-piece $O_3$. The eye-piece may as well be considered to belong to the parts of the one or the other system, and, as in the examples described hereinbefore, the parts of a telescope used in connection with the device may be regarded to belong to the one or to the other system.

When the roof is dispensed with, the examples for instance according to Figures 2 and 5 represent the system pairs which provide only one sighting plane.

Such a variation of the reflecting system according to Figure 7 is represented by Figure 8.

The half-silvered reflecting surface 27 is the cemented surface of two glass bodies in the one of which, a pentagonal prism 28, a silvered reflecting surface 29 is substituted for the roof. The lengths of the paths of the two partial rays are equal. Z—Z indicates the sighting line, and Z'—Z' represents the image of this sighting line.

Figure 9 shows schematically a device for reading the one coordinate of a part to be displaced according to two coordinates. A slide 30 may be displaced in two guides 31 and 32 in one direction. This slide supports two guides 33 and 34 in which a slide 35 having a scale 36 may be displaced in another direction. The displacement of the slide 35 is measured by means of a pair of optical systems the one of which consists of an eye-piece 37, two semi-transparently cemented prisms 38 and 39, a pentagonal prism 40, the positive part 41 and the negative part 42 of a telescope objective and of a plano-parallel plate 43 rotatable about the axis $A_1$—$A_1$. The other system consists of the eye-piece 37, the prism 38, an objective 44 and a plano-parallel plate 45 rotatable about the axis $A_2$ at right angles to the axis $A_1$—$A_1$. This rotation is assumed to cooperate with a graduation fitted to the apparatus and not taking part of the rotation of the plate 45, this graduation being omitted in the drawings.

The graduation is seen twice in the telescope, the images being laterally inverse. By turning the plate 43 about the axis $A_1$—$A_1$, the one image may be upwardly displaced relatively to the other, a field of view according to Figure 10 being obtained in this manner. The lower of the two graduations has from the left to the right numerals 0, 5, 10. Below each numeral the same numeral appears in mirror writing. The upper of the two graduations is displaced to the right, relatively to the lower graduation, by for instance 0.2 of the magnitude represented by each division line, and to this upper graduation belong the two upper rows of numerals the lower one of which is now readable. The value of the coinciding loci of the two graduations is 5.1. A more accurate fraction will be obtained when the plate 45 is so turned about the axis $A_2$ as to make the division lines 5 exactly coincide with each other, the fraction being read on the graduation associated with the plate. Provision may be made that only the second and third rows of numerals are visible.

By using a pair of systems according to Figure 7, a scale image according to Figure 11 would be obtained. Also in this case, it is convenient to provide an exact coincidence of the two line systems by optical means, for instance a plano-parallel plate, which is suitably placed in front of both the objectives. The reading of the reverse graduation may be facilitated in the described manner by placing below the numerals the mirror images of same.

Instead of making two lines represent one line, the scale may have double lines and be so disposed according to Figure 12 that an adjustment may be effected in such a manner that three equal spaces are created between the two lines of the one and the two lines of the other scale image, and this in the case of the reflection as well as in the case of a complete inversion of the second image of the scale relative to its first image. Figure 12 illustrates this case for complete inversion.

When devices according to Figure 9 are used, that is to say when two reverse images displaced relatively to each other in the direction of the scale are obtained, the graduation may be such that each division line is represented by a double line and a medial line below or above. Figure 13 shows the images obtained in this case, one image being represented in full and the other in dash lines.

Figure 14 shows a complete device according to the invention, which has a telescopic objective as defined above. This objective consists of a converging system 46 and a diverging system 47, these two systems representing a Galilean telescope. Between these two systems is disposed a prism system 48, which corresponds to Figures 3 to 5 and provides two images which are completely reversed relatively to each other. These three systems are held by a tube 49 attached to a base plate 50. Aiming marks placed on the surface to be examined, at a certain distance from each other, and at one and the same height above the said surface are imaged by this system on a reduced scale at the ratio of the focal lengths of the systems 46 and 47. In the square of this ratio, the images are at distances from each other which are smaller than the distances of the aiming marks. The images are viewed by means of a magnifying microscope which consists of an objective 51 and an eye-piece 52. This microscope is held by a support 53 which serves at the same time as a guide for the fine adjustment to the aiming-mark images produced by the Galilean telescope, which is effected by means of a gear 54.

The operation of the devices according to the invention is as follows. When the evenness of a surface is to be examined, e. g. by means of a device according to Figure 14, this device is used in the following manner. The supporting surface of a holder containing two aiming marks, which lie at a certain distance from each other and at one and the same height above the said surface, is placed on the surface to be examined. Subsequently thereto, the sighting device is so positioned that four images, namely the two images which this device produces of the one mark and the two images which this device produces of the other mark, coincide in the field of view of the microscope of the said sighting device. When the said holder is displaced in the direction of the line interconnecting the two marks and the coincidence of the four images remains, the surface is even in the said direction. The evenness of the surface in other directions is examined in exactly the same manner.

When examining rectilinear guides, the said method is applied only in the guiding direction of the guide.

The examination of the coincidence of bores with respect to their axes is effected as follows. The said holder is so introduced into the one bore that the two marks lie in the axis of this bore, and the sighting device is introduced into the other bore in such a manner that its optical axis coincides with the axis of this other bore. A coincidence of the four said images is equivalent to a coincidence of the axes of the bores.

I claim:

An optical device for the examination of axial directions and the like, comprising an optical observation instrument having an eye-piece and at least one objective, and a prism system having a ray entrance surface, a ray dividing surface which is located behind the said entrance surface and adapted to partly transmit and partly reflect light rays impinging on it and which is inclined relatively to this entrance surface at about 45°, two groups of reflecting surfaces located behind the said dividing surface, the one of the said groups consisting of two pairs of reflecting surfaces, the reflecting surfaces of each pair being parallel to each other and at right angles to the reflecting surfaces of the other pair, the rearmost of these four surfaces being a ray dividing surface and adapted to partly transmit and partly reflect rays impinging on it, and the other of the said groups consisting of three reflecting surfaces constituting together with the first said ray dividing surface an image reversing system, and an exit surface lying behind the said two groups of reflecting surfaces and being inclined at about 45° relatively to the rearmost reflecting surface of each of the said two groups.

OTTO EPPENSTEIN.